(12) United States Patent
Shimizu et al.

(10) Patent No.: US 7,537,228 B2
(45) Date of Patent: May 26, 2009

(54) MONOCYCLE

(75) Inventors: Toshinari Shimizu, Tokyo (JP); Susumu Sasaki, Tokyo (JP); Humiyoshi Suetake, Uzi (JP)

(73) Assignees: Nihon University, Tokyo (JP); Pixen Inc., Tokyo (JP)

( * ) Notice: Subject to any disclaimer, the term of this patent is extended or adjusted under 35 U.S.C. 154(b) by 332 days.

(21) Appl. No.: 10/565,198

(22) PCT Filed: Jul. 22, 2003

(86) PCT No.: PCT/JP03/09289

§ 371 (c)(1),
(2), (4) Date: May 26, 2006

(87) PCT Pub. No.: WO2005/007497

PCT Pub. Date: Jan. 27, 2005

(65) Prior Publication Data

US 2006/0279057 A1    Dec. 14, 2006

(51) Int. Cl.
*B62K 1/00* (2006.01)
(52) U.S. Cl. .......................................... 280/205; 152/89
(58) Field of Classification Search ................. 280/205; 152/89
See application file for complete search history.

(56) References Cited

U.S. PATENT DOCUMENTS

| 1,579,589 | A | * | 4/1926 | Ziperstein | ..................... 152/89 |
| 3,044,518 | A | | 7/1962 | Gregg | |
| 3,083,036 | A | * | 3/1963 | Cornell, III et al. | ......... 280/205 |
| D273,287 | S | * | 4/1984 | Evans | ........................ D12/107 |
| 5,002,295 | A | * | 3/1991 | Lin | ............................. 280/205 |
| 5,868,413 | A | * | 2/1999 | Cabrera | ..................... 280/205 |
| 6,561,594 | B1 | * | 5/2003 | Lin | ......................... 301/124.2 |

FOREIGN PATENT DOCUMENTS

| JP | 17 14325 | 12/1942 |
| JP | 36 12016 | 5/1961 |
| JP | 56 33786 | 8/1979 |
| JP | 46481/1981 | 4/1981 |
| JP | 39288/1984 | 3/1984 |
| JP | 3 501108 | 3/1991 |
| JP | 64578/1994 | 3/1994 |
| JP | 10-236369 | 9/1998 |
| JP | 2001 30972 | 2/2001 |

* cited by examiner

*Primary Examiner*—Paul N Dickson
*Assistant Examiner*—Marlon A Arce
(74) *Attorney, Agent, or Firm*—Oblon, Spivak, McClelland, Maier & Neustadt, P.C.

(57) ABSTRACT

A monocycle, includes a wheel, a pedal, a frame portion, a saddle portion, a handle portion, and a braking unit. The wheel includes a rim having a tire, an axle arranged at a center portion of the rim, and a connecting piece for connecting the rim and the axle. The pedal can be driven to rotate the axle of the wheel. The frame portion is pivotably fixed with the axle on one end side thereof. The saddle portion is connected to the other end side of the frame portion. The handle portion is slidably and fixably connected to the other end side of the frame portion such that handle shafts of the handle portion can be slid to a position below the axle to form a stand with a bottom of the wheel. The braking unit can manually brake the wheel.

7 Claims, 6 Drawing Sheets

MONOCYCLE

TECHNICAL FIELD

The present invention relates to remodeling of a monocycle, particularly relates to a monocycle provided with a handle portion, enabling to brake a wheel by a brake and enabling a variety of riding attitudes by being able to deal with jumping or the like by providing a suspension at the wheel.

BACKGROUND ART

There has been proposed a monocycle of this kind including a wheel comprising a rim of a predetermined diameter having a tire, an axle arranged at a center portion of the rim, and a connecting piece for connecting the rim and the axle, a pedal directly connected to the axle of the wheel, a frame portion pivotably fixed with the axle at one end side thereof, a saddle portion connected to other end side of the frame portion, and a handle portion connected to the other end side of the frame portion (refer to JP-A-10-236369).

According to the monocycle, owing to presence of the handle portion, there is a not a peculiar feeling in comparison with a monocycle of a background art which is not provided with the handle portion, and even a grown-up person can ride thereon.

[Patent Reference 1] JP-A-10-236369

DISCLOSURE OF THE INVENTION

However, according to the monocycle of the background art, owing to the above-described structure, there are drawbacks as follows.

(1) Since dimensions thereof are fixed, there is a drawback that a proper attitude in accordance with a physical constitution of a person riding on a monocycle cannot be maintained, and a person cannot stably ride thereon depending on the physical constitution.
(2) Since there is not a brake operated by the hand, there is a drawback that fine braking operation cannot be carried out, and it is difficult to maintain a stable attitude.
(3) Since shock is absorbed only by the tire, there is a drawback that special operation of hopping or the like cannot be carried out.
(4) It is difficult to adjust an angle between the saddle portion and the handle portion, and the angle cannot be adjusted to bring about the stable attitude.
(5) There is a drawback that the handle portion cannot be contained or the like as necessary. The invention has been carried out in order to resolve the above-described drawbacks and it is an object thereof to provide a monocycle provided with a handle portion, further, enabling to apply brake, further, enabling a variety of riding attitudes by being able to deal with jumping or the like by providing a suspension to a wheel.

In order to achieve the above-described object, a monocycle according to the invention according to claim 1 is characterized in a monocycle comprising a wheel comprising a rim of a predetermined diameter having a tire, an axle arranged at a center portion of the rim, and a connecting piece for connecting the rim and the axle, a pedal capable of driving to rotate the axle of the wheel, a frame portion pivotably fixed with the axle on one end side thereof, a saddle portion connected to other end side of the frame portion, and a handle portion connected to the other end side of the frame portion, wherein the handle portion is slidably and fixably provided on the other end side of the frame portion, the handle portion and a saddle of the saddle portion are constituted by a structure of being arranged at a predetermined angle therebetween, the connecting piece is arranged with at least three pieces of suspensions at intervals of 120 degrees between the rim and the shaft, further comprising brake means for manually braking the wheel.

According to the invention according to claim 2, in the monocycle according to claim 1 of the application, there is provided the monocycle according to claim 1, characterized in that the brake means comprises a braking mechanism provided at the wheel and operated to stop rotation of the wheel, a brake lever provided at a handle of the handle portion, and a transmitting mechanism provided between the brake lever and the braking mechanism for transmitting a brake operation drive force of the drive lever, and the wheel is made to be able to be braked manually by transmitting the brake operation drive force of the brake lever to the braking mechanism by the transmitting mechanism.

According to the invention according to claim 3, in the monocycle according to claim 1 of the application, there is provided the monocycle according to claim 1, characterized in being constituted such that one end portion of a saddle fixing arm is fixed attachably and detachably to and from the other end side of the frame portion, a saddle attaching bar is slidably fixed to other end portion of the saddle fixing arm, and by pivotably fixing the saddle to the saddle attaching bar and adjusting the saddle to be able to be maintained by a predetermined angle, the saddle is made to be able to be adjusted relative to a handle shaft of the handle portion in a predetermined range.

BEST MODE FOR CARRYING OUT THE INVENTION

An explanation will be given of the best mode for carrying out the invention in reference to the drawings as follows.

Figure 1:
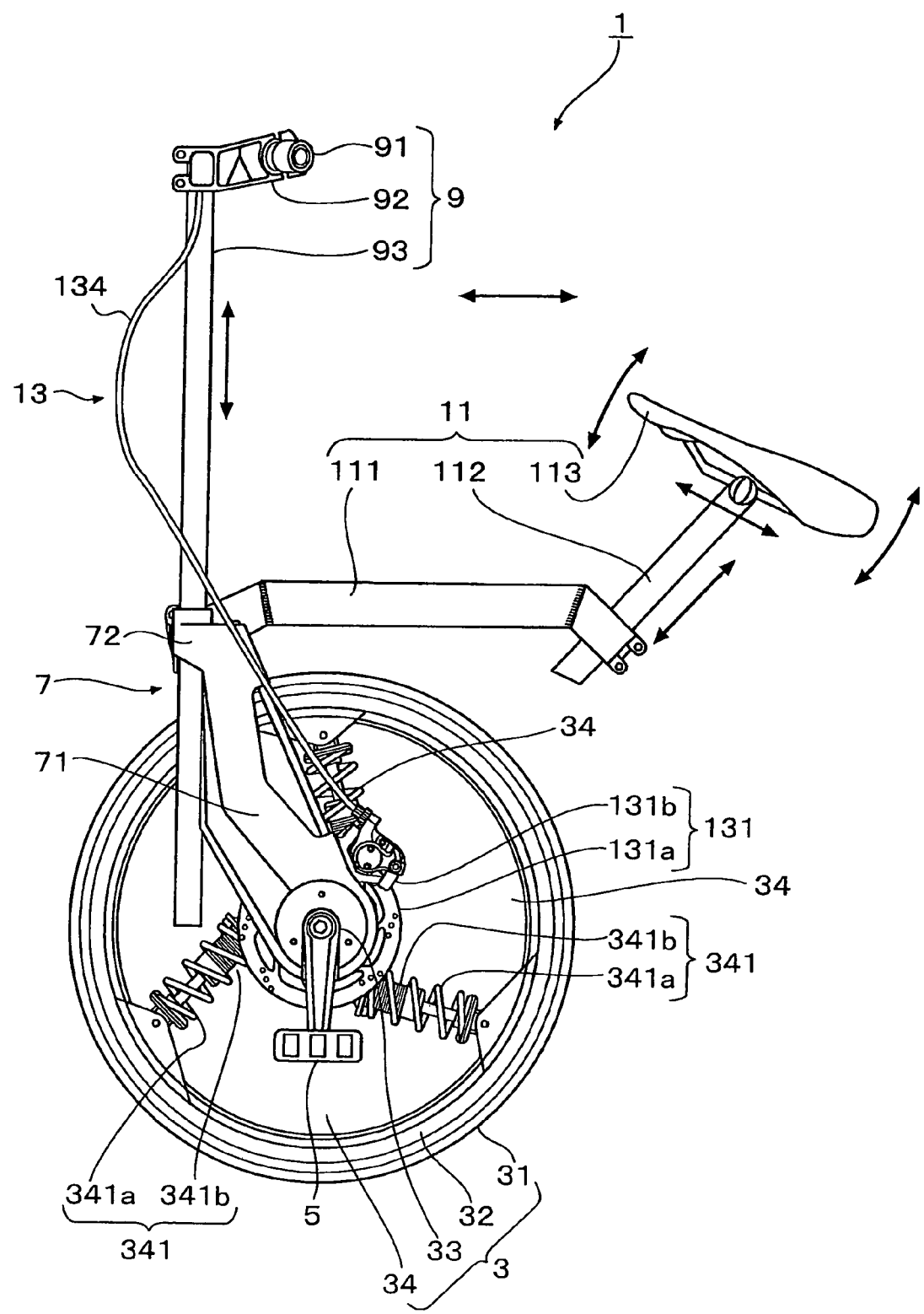
FIG. 1 is a side view showing a monocycle according to the best mode for carrying out the invention.
Figure 2:
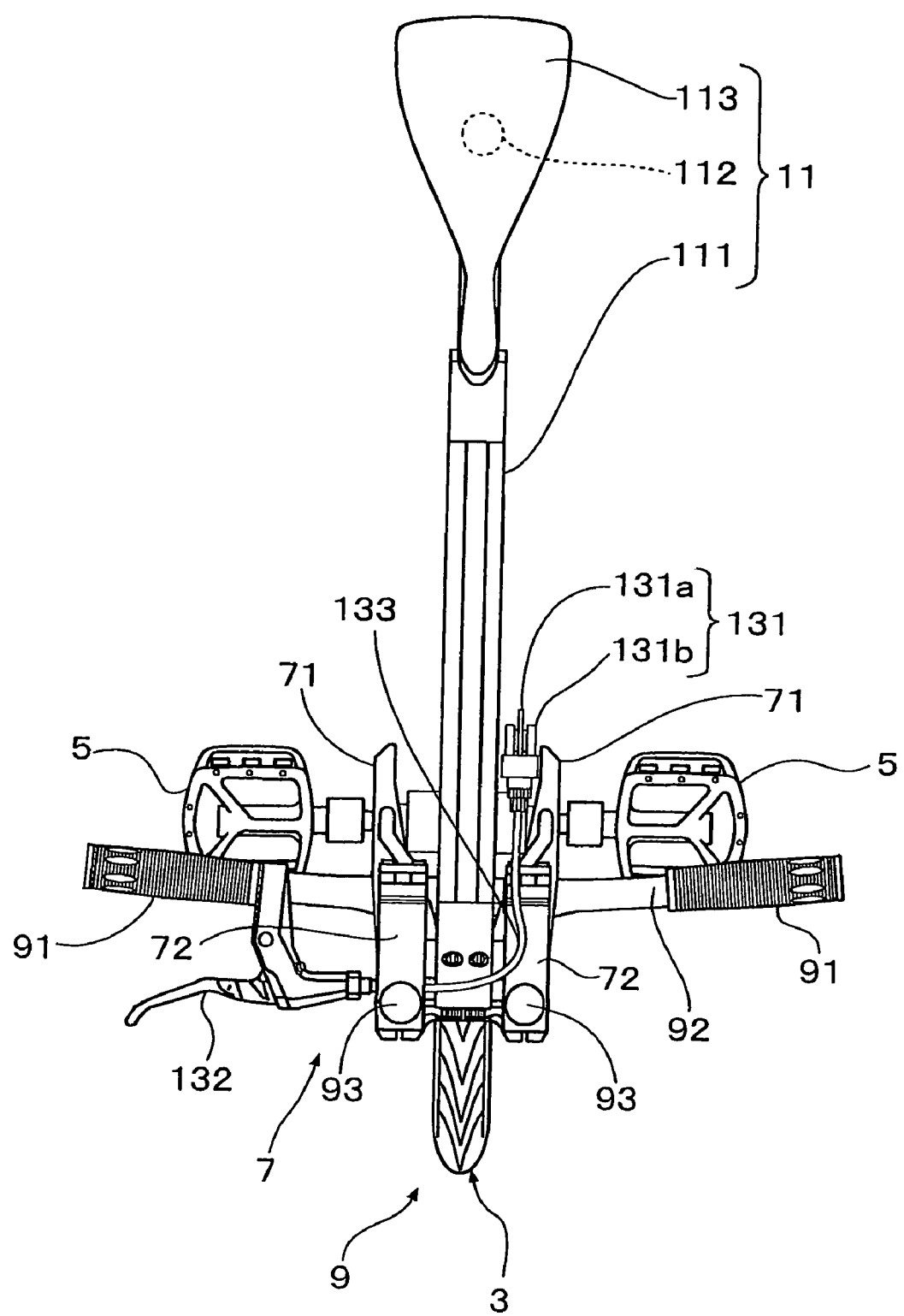
FIG. 2 is a plane view showing the monocycle according to the best mode for carrying out the invention.
Figure 3:
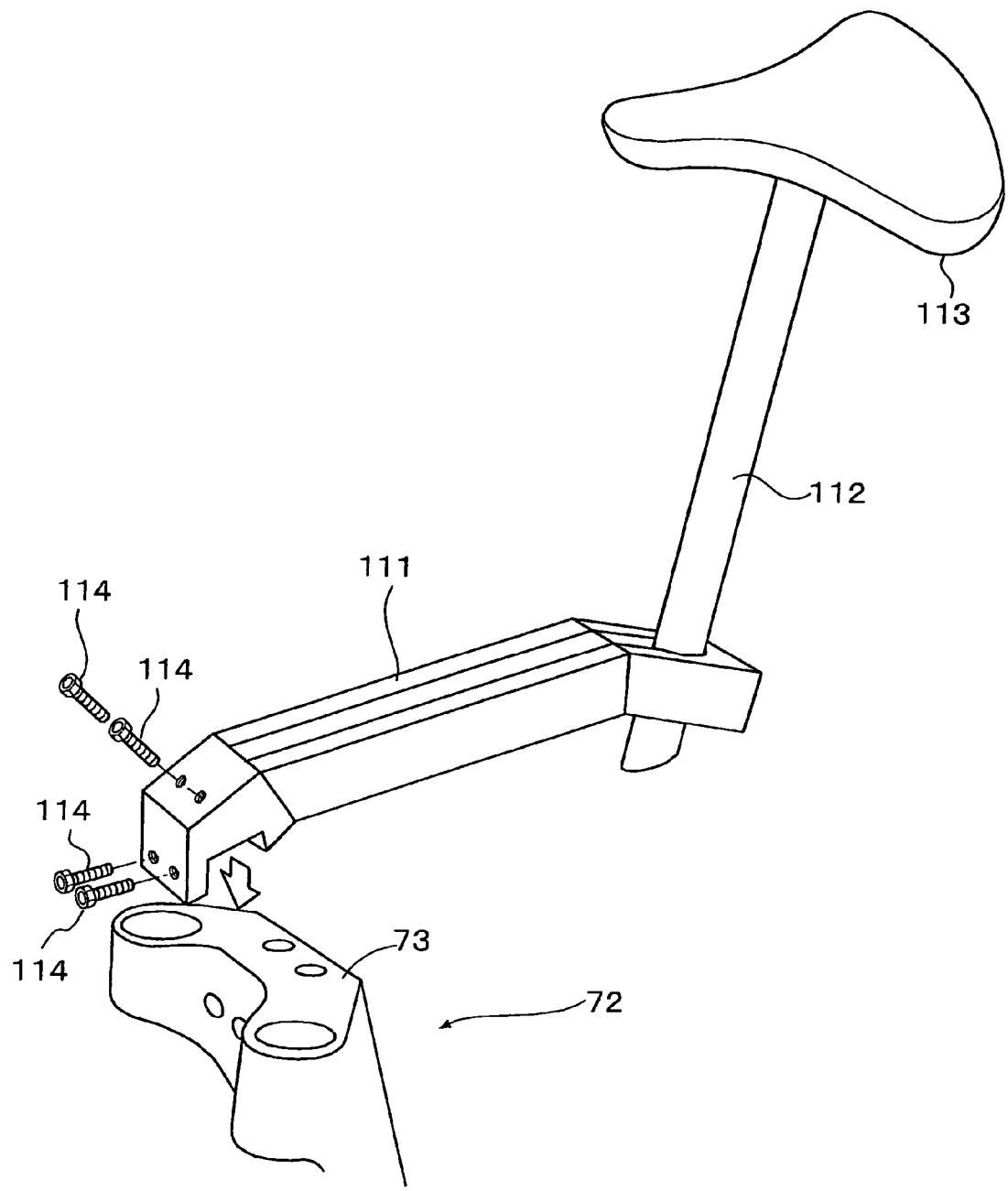
FIG. 3 is a perspective view enlarging to show an essential portion of a vicinity of a saddle portion of the monocycle according to the best mode for carrying out the invention.
Figure 4:
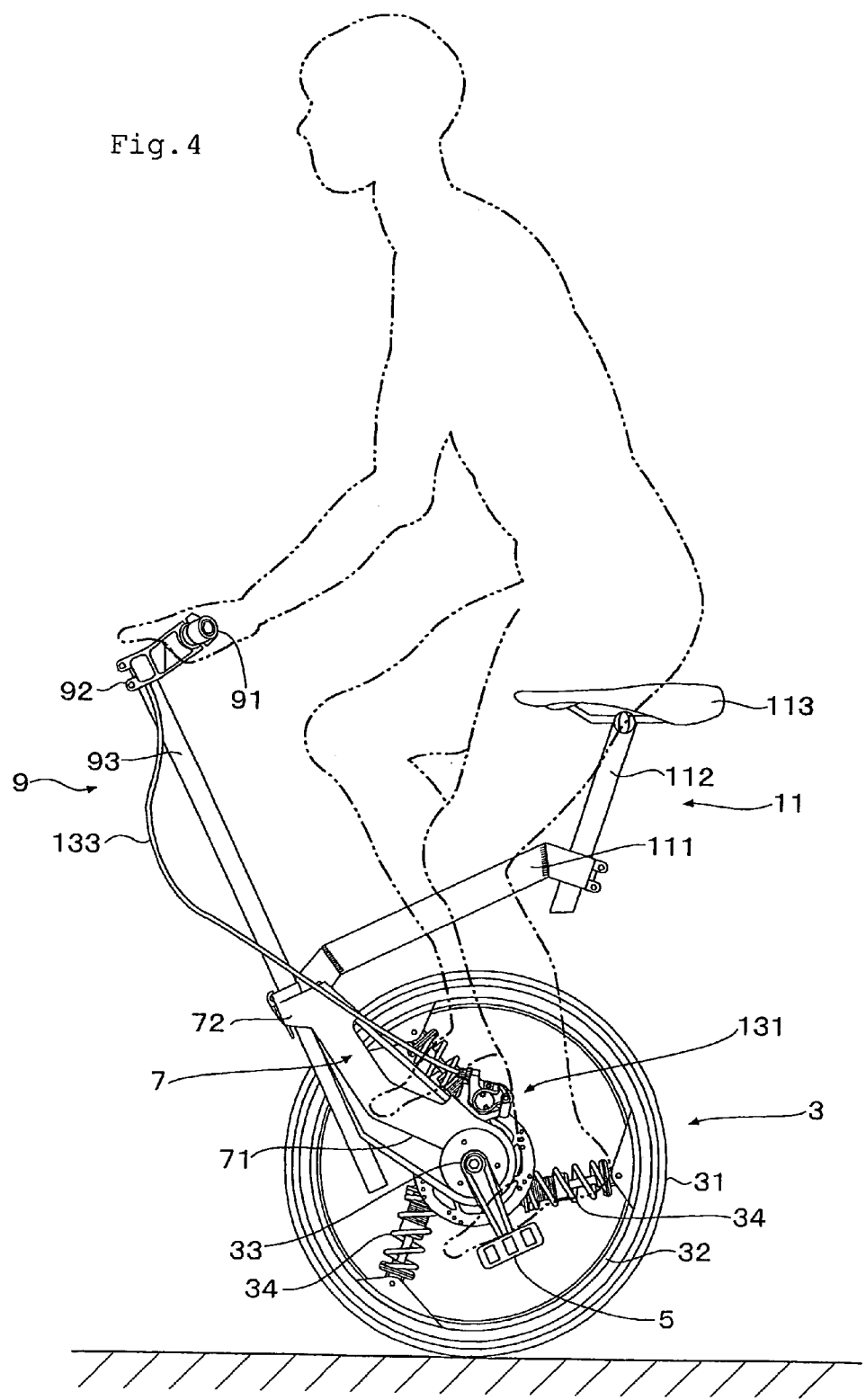
FIG. 4 is a side view showing a state in which a person rides on the monocycle according to the best mode for carrying out the invention.
Figure 5:
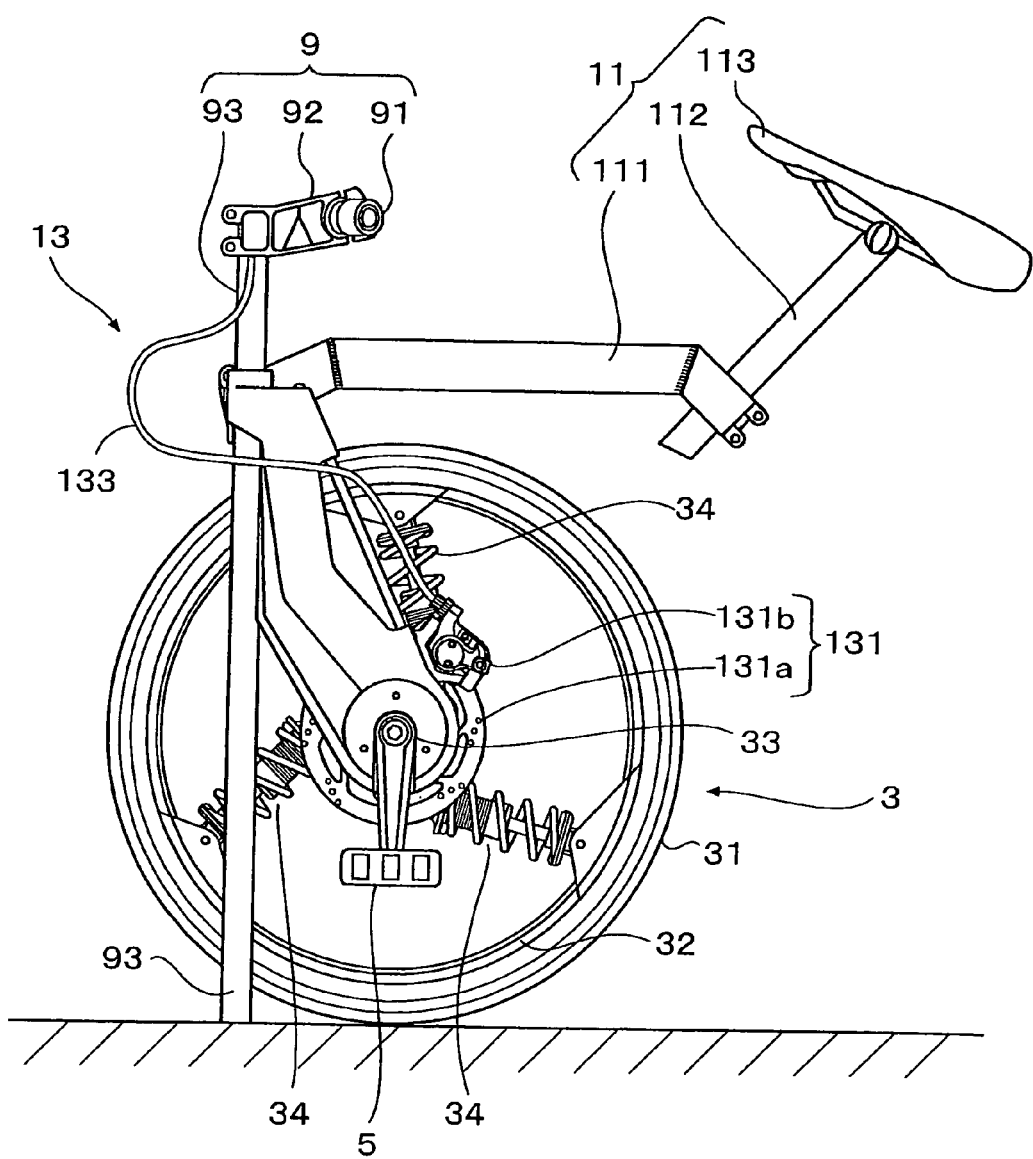
FIG. 5 is a side view showing a state in which a handle portion is contained in the monocycle according to the best mode for carrying out the invention.
Figure 6:
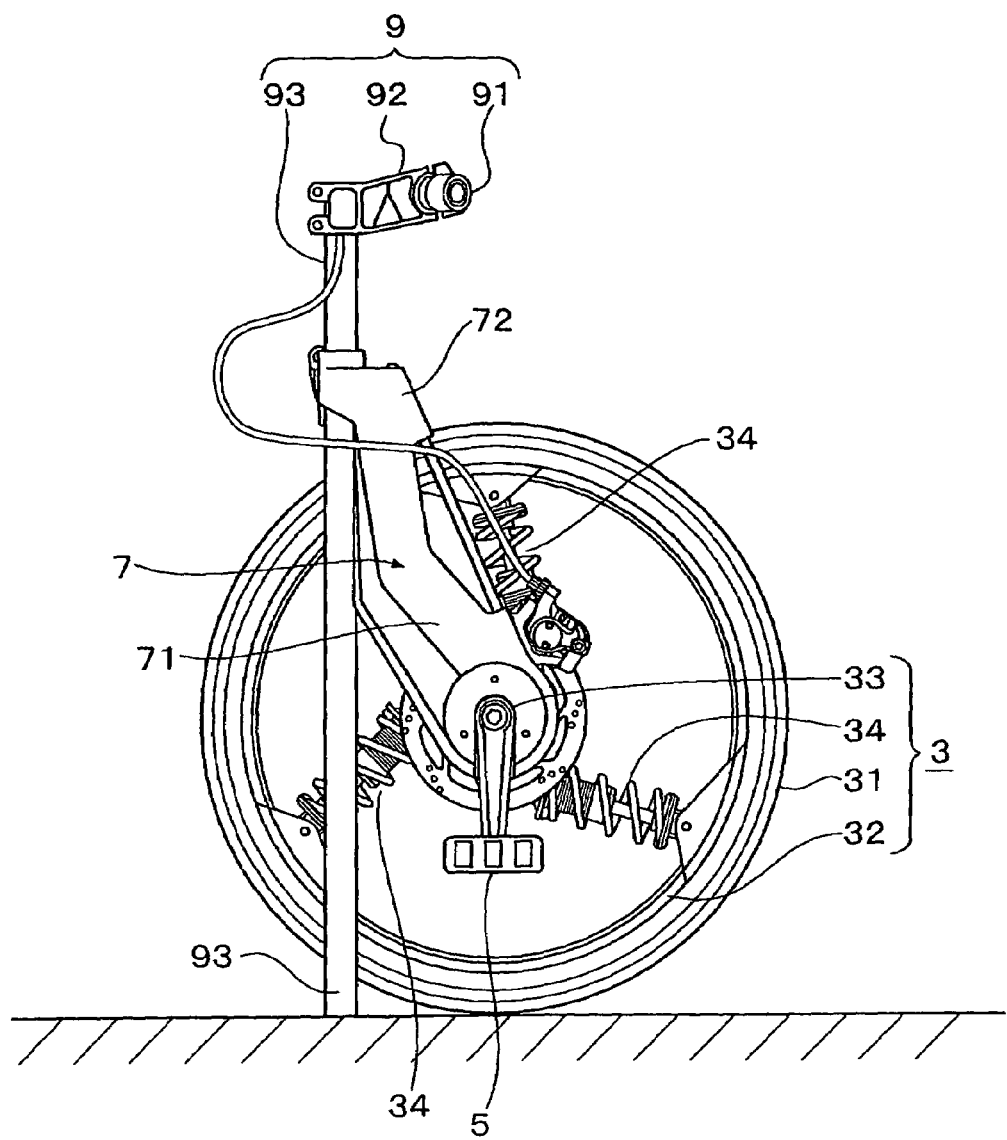
FIG. 6 is a side view showing a state in which the handle portion is contained and a periphery of the saddle portion is removed in the monocycle according to the best mode for carrying out the invention.

FIG. 1 through FIG. 6 are the drawings for explaining the best mode for carrying out the invention. Here, FIG. 1 is a side view showing a monocycle according to the best mode for carrying out the invention. FIG. 2 is a plane view showing the monocycle according to the best mode for carrying out the invention. FIG. 3 is a perspective view enlarging to show an essential portion of a vicinity of a saddle portion of the monocycle according to the best mode for carrying out the invention. FIG. 4 is a side view showing a state in which a person rides on the monocycle according to the best mode for carrying out the invention. FIG. 5 is a side view showing a state in which a handle portion is contained in the monocycle according to the best mode for carrying out the invention. FIG. 6 is a side view showing a state in which the handle portion is contained and a periphery of the saddle portion is removed in the monocycle according to the best mode for carrying out the invention.

In the drawings, a monocycle 1 according to the best mode for carrying out the invention is provided with a wheel 3, left and right pedals 5, 5, a frame portion 7, a handle portion 9, a saddle portion 11, and brake means 13 in a gross classification and is constituted as follows.

That is, the wheel 3 is constituted by a rim 32 of a predetermined diameter having a tire 31, an axle 33 arranged at a center portion of the rim 32, and a connecting piece 34 for connecting the rim 32 and the axle 33. Here, as shown by FIG. 1, FIG. 4, FIG. 5 and FIG. 6, the connecting piece 34 is arranged with at least 3 pieces of suspensions 341, 341, 341 at intervals of 120 degrees between the rim 32 and the axle 33. As is known also from FIG. 1, FIG. 4, FIG. 5 and FIG. 6, the suspension 341 comprises a coil spring 341a, and a shock absorber 342 provided on a coil inner side of the coil spring 341, a predetermined shock force is absorbed by operation of the coil spring 341 and the shock absorber 342, and a pumping state is made to be able to be maintained by the coil spring 341.

As shown by FIG. 1 through FIG. 6, the pedals 5, 5 are directly connected to the axle 33 of the wheel 3, and a drive force of the pedals 5, 5 is made to be able to be transmitted to the wheel 3.

As shown by FIG. 1 and FIG. 2, the frame portion 7 is formed in a fork shape by constituting other end portion side (base portion) 72 of the frame portion 7 by commonly constituting other end sides of two pieces of long plate shape members 71, 71 and constituting one end side of the frame portion 7 by maintaining one end sides of two pieces of the long plate shape members 71, 71 at a constant interval. The axle 33 of the wheel 3 is pivotably fixed to the one end sides of two pieces of the long plate shape members 71, 72 of the frame portion 7 (the one end side of the frame portion 7).

The saddle portion 11 is fixed to the base portion 72 constituting the other end side of the frame portion 7. Similarly, the handle portion 9 is slidably and fixably arranged at the base portion 72 constituting the other end side of the frame portion 7. By arranging the handle portion 9 and the saddle portion 11, there is constituted a structure of arranging a handle of the handle portion 9 and a saddle of the saddle portion 11 at a predetermined angle therebetween.

The monocycle 1 is provided with the brake means 13 capable of manually braking the wheel 3.

An explanation will be given of a structure of the monocycle 1 according to the best mode for carrying out the invention further in details.

As shown by FIG. 1 and FIG. 2, the handle portion 9 comprises a handle 92 having left and right grip portions 91, 91, and handle shafts 93, 93 provided at a predetermined interval therebetween at a center portion of the handle 92 in a direction orthogonal thereto.

The respective handle shafts 93, 93 are slidably fitted to containing holes 73, 73 provided at the base portion 72 on the other end side of the frame portion 7 and made to be slidable or fixed by operation of a constraining lever, not illustrated, provided at a vicinity of the containing holes 73, 73 of the base portion 72.

As shown by FIG. 3, the saddle portion 11 comprises a saddle fixing arm 111 in a shape of a square pillar having a predetermined length, a saddle attaching bar 112 constituted by a shape of a round bar having a predetermined length, and a saddle 113 to be seated.

According to the saddle fixing arm 111, as shown by FIG. 3, one end portion of the saddle fixing arm 111 is made to be attachable and detachable to and from an attaching seat 74 provided at the base portion 72 on the end side of the frame portion 7 by screws 114, 114, . . . The saddle attaching bar 112 is made to be slidable or can be fixed at other end side of the saddle fixing arm 111 by operation of a screw, not illustrated. The saddle 113 is made to be fixed to the saddle attaching bar 112 pivotably and is made to be able to be adjusted to be maintained at a predetermined angle. By adjusting a length of attaching the saddle attaching bar 112 to the saddle fixing arm 111 and an angle of the saddle 113 relative to the saddle attaching bar 112, as shown by FIG. 1, the saddle portion is made to be able to be adjusted relative to the handle shafts 93, 93 of the handle portion 9 in a predetermined range.

The brake means 13 is provided with a braking mechanism 131 provided at the wheel 3 and operated to stop rotation of the wheel, a brake lever 132 provided at the handle 92 of the handle portion 9, and a transmitting mechanism 133 provided between the brake lever 132 and the braking mechanism 131 for transmitting a brake operation drive force of the brake lever 132, and the wheel 3 can manually be braked by transmitting the brake operation drive force of the brake lever 132 to the braking mechanism 131 by the transmitting mechanism. The braking mechanism 131 is constituted by a disk 131a provided at the axle, and a brake pad 131b fixed to the long plate shape member 71 of the frame portion 7 for pinching the disk 141a by the brake operation drive force. Further, the transmitting mechanism 133 may be constituted by a cable wire. Further, the brake lever 132 may use a publicly-known structure.

The monocycle constituted by such a structure is used as follows.

First, as shown by FIG. 4, a person is seated on the saddle 113 of the saddle portion 11 and grips the grip portions 91, 91 of the handle 92 of the handle portion 9 by the hands. When a predetermined attitude is maintained, the person puts the feet on the pedals 5, 5 and pedals the monocycle.

At this occasion, the brake operation drive force is transmitted to the braking mechanism 131 via the transmitting mechanism 133 by pertinently gripping the brake lever 132 of the brake means 13 to apply a pertinent braking force to the wheel 3.

The monocycle starts to move forward by adjusting the braking force and a force of pedaling the pedals 5, 5 and maintaining the attitude. When a constant speed is reached, the attitude is stabilized, and the monocycle can be moved as it is.

Further, when not used, by bringing about a state as shown by FIG. 5 by sliding the handle shafts 93, 93 of the handle portion 9, the handle shafts 93, 93 can be contained while erecting the monocycle by three points support.

Further, when the saddle portion 11 is not needed, as shown by FIG. 6, the saddle fixing arm 111 can be removed from the base portion 72 of the frame portion 7.

The monocycle according to the best mode for carrying out the invention is constituted as described above and therefore, the following advantages are achieved.

(1) Positions of the handle portion 9 and the saddle portion 11 can be adjusted to proper positions in accordance with a physical constitution of a person riding on the monocycle 1 and therefore, a proper attitude can be maintained in accordance with the physical constitution of the person riding on the monocycle and stable riding can be carried out.

(2) By operating to brake the brake lever 132 of the brake means 13 by the hand, the wheel 3 can be braked, fine braking operation can be carried out and therefore, the stable attitude can be maintained.

(3) In addition to shock absorption by the tire 31, shock can be absorbed and a jumping force can be generated by the suspension 34 provided between the axle 33 and rim 32 and therefore, operation of hopping or the like can be carried out and a variety of play can be enjoyed.

(4) The angle between the saddle 113 of the saddle portion 11 and the handle shafts 93, 93 of the handle portion 9 can be adjusted to that of the stable attitude and stable running can be carried out.

(5) By moving the handle shafts 93, 93 of the handle portion 9 to be shortened relative to an upper portion of the base portion 72 as necessary, the monocycle 1 is made to be able to be contained by erecting the monocycle 1 by itself in containing the monocycle 1, and a space in containing the monocycle 1 can be reduced.

Although an explanation has been given such that the left and right pedals 5, 5 are directly connected to the axle 33 of the wheel 3 in the monocycle according to the best mode for carrying out the invention, a transmission may be provided between the left and right pedals 5, 5 and the axle 33 of the wheel 3. In this case, the transmission is applicable thereto by a technology of an incorporated transmission of a background art when rates of rotating the left and right pedals 5, 5 are made to be the same as each other.

INDUSTRIAL APPLICABILITY

As described above, a monocycle according to the invention is a monocycle comprising a wheel comprising a rim of a predetermined diameter having a tire, an axle arranged at a center portion of the rim, and a connecting piece for connecting the rim and the axle, a pedal capable of driving to rotate the axle of the wheel, a frame portion pivotably fixed with the axle on one end side thereof, a saddle portion connected to other end side of the frame portion, and a handle portion connected to the other end side of the frame portion, wherein the handle portion is slidably and fixably provided on the other end side of the frame portion, the handle portion and a saddle of the saddle portion are constituted by a structure of being arranged at a predetermined angle therebetween, the connecting piece is arranged with at least three pieces of suspensions at intervals of 120 degrees between the rim and the shaft, further comprising brake means for manually braking the wheel and therefore, the following effect is achieved.

(1) The saddle portion and the handle portion can be adjusted to proper positions in accordance with a physical constitution of a person riding on the monocycle and therefore, a proper attitude can be maintained in accordance with the physical constitution of the person riding on the monocycle and stable riding can be carried out.

(2) The brake can be operated by the hand and therefore, fine braking operation can be carried out and a stable attitude can be maintained.

(3) Shock absorption by the tire and shock absorption by the suspension provided between the wheel axle and the rim can be carried out and therefore, operation of hopping or the like can be carried out and a variety of play can be enjoyed.

(4) An angle between the saddle portion and the handle portion can be adjusted to that of a stable attitude.

(5) A handle shaft of the handle portion can be shortened at an upper portion on the other end side of the frame portion as necessary, the monocycle can be contained by erecting the monocycle by itself in containing the monocycle and a space thereof can be reduced.

The invention claimed is:

1. A monocycle, comprising:
   a wheel comprising a rim of a predetermined diameter having a tire, an axle arranged at a center portion of the rim, and a connecting piece for connecting the rim and the axle;
   a pedal capable of driving to rotate the axle of the wheel;
   a frame portion pivotably fixed with the axle on one end side thereof;
   a saddle portion connected to other end side of the frame portion;
   a handle portion slidably and fixably connected to the other end side of the frame portion such that handle shafts of the handle portion are configured to be slid to a position below the axle to form a stand with a bottom of the wheel; and
   means for braking to manually brake the wheel,
   wherein, the handle portion and a saddle of the saddle portion are constituted by a structure being arranged at a predetermined angle therebetween, the connecting piece is arranged with at least three pieces of suspensions at intervals of 120 degrees between the rim and the axle.

2. The monocycle according to claim 1, wherein the means for braking comprises a braking mechanism provided at the wheel and operated to stop rotation of the wheel, a brake lever provided at a handle of the handle portion, and a transmitting mechanism provided between the brake lever and the braking mechanism for transmitting a brake operation drive force of the brake lever, and the wheel is made to be able to be braked manually by transmitting the brake operation drive force of the brake lever to the braking mechanism by the transmitting mechanism.

3. The monocycle according to claim 1, wherein one end portion of a saddle fixing arm is fixed attachably and detachably to and from the other end side of the frame portion, a saddle attaching bar is slidably fixed to other end portion of the saddle fixing arm, and by pivotably fixing the saddle to the saddle attaching bar and adjusting the saddle to be able to be maintained by a predetermined angle, the saddle is made to be able to be adjusted relative to the handle shafts of the handle portion in a predetermined range.

4. A monocycle, comprising:
   a wheel comprising a rim of a predetermined diameter having a tire, an axle arranged at a center portion of the rim, and a connecting piece to connect the rim and the axle;
   a pedal connected to the axle of the wheel;
   a frame portion pivotably fixed with the axle on a first end of the frame portion;
   a saddle portion connected to a second end of the frame portion and including a saddle;
   a handle portion slidably and fixably connected to the second end of the frame portion such that handle shafts of the handle portion are configured to be slid to a position below the axle to form a stand with a bottom of the wheel; and
   a brake configured to manually brake the wheel,
   wherein the handle portion and the saddle are arranged at a predetermined angle.

5. The monocycle according to claim 4, wherein
   the brake comprises a braking mechanism provided at the wheel to stop rotation of the wheel, a brake lever provided at a handle of the handle portion, and a transmitting mechanism provided between the brake lever and the braking mechanism to transmit a brake operation drive force of the brake lever, and the wheel is configured to be braked manually by transmitting the brake operation drive force of the brake lever to the braking mechanism by the transmitting mechanism.

6. The monocycle according to claim 4, wherein a first end of a saddle fixing arm is connected to the second end of the frame portion, a saddle attaching bar is slidably fixed to a second end of the saddle fixing arm, and by pivotably fixing the saddle to the saddle attaching bar and adjusting the saddle attaching bar relative to the saddle fixing arm, the saddle is configured to be adjusted relative to the handle shafts of the handle portion within a predetermined range.

7. The monocycle according to claim 4, wherein the connecting piece includes at least three suspension pieces at intervals of 120 degrees between the rim and the axle.

* * * * *